March 4, 1930.        L. G. TAYLOR            1,749,268
                    WHEEL ALIGNING GAUGE
                     Filed April 6, 1927
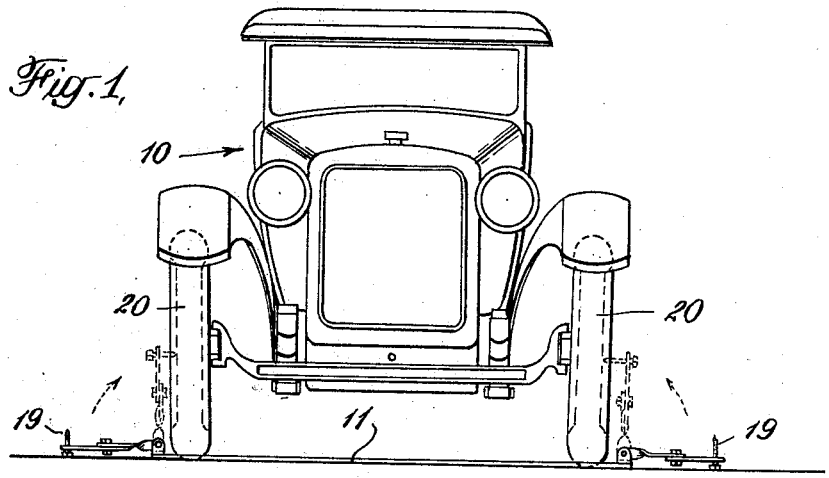
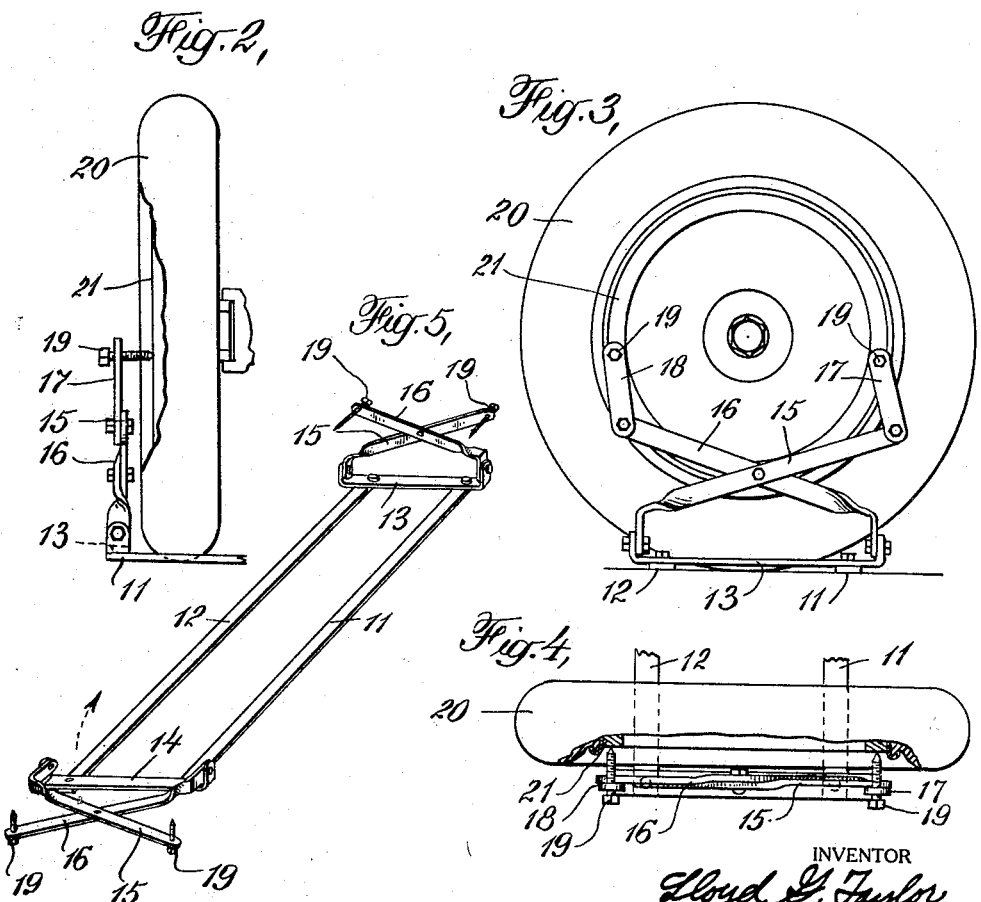
INVENTOR
Lloyd G. Taylor
BY
ATTORNEYS Patented Mar. 4, 1930

1,749,268

UNITED STATES PATENT OFFICE

LLOYD GEHMAN TAYLOR, OF ALLENTOWN, PENNSYLVANIA

WHEEL-ALIGNING GAUGE

Application filed April 6, 1927. Serial No. 181,316.

This invention relates to vehicle wheel aligners and is concerned particularly with the provision of a device for aligning the wheels of automobiles and like vehicles. It is a matter of common knowledge that if the wheels of an automobile, for example, are not parallel with respect to each other; i. e., out of alignment, excessive wear on the tires results. It is, therefore, important that the wheels of automobiles be in exact alignment at all times in order to obviate this excessive wearing of the tires and also to eliminate the additional strain on the bearings of the disaligned wheel.

The new device is adapted to be placed beneath either the front or rear wheels of a vehicle so as to be accurately centered thereby in the plane of the hubs of the wheels, and measures the alignment of the wheels between the outside surfaces of the fellies of opposite wheels. This particular manner of measuring the alignment of vehicle wheels is accurate and positive, permits an economical construction of the wheel aligning device and also allows of flexibility and facility of operation with a minimum amount of labor and skill. In order to check the alignment of the wheels around their entire periphery, the wheels may be raised from the ground and rotated while engaged by the wheel aligner and without interference thereby.

A better understanding of the invention may be had by reference to the accompanying drawings, in which Fig. 1 illustrates the manner of measuring the alignment of the front wheels of an automobile by means of the aligning device of this invention.

Fig. 2 shows the measuring points of the aligner engaging the felly of a wheel.

Fig. 3 is a side view of a wheel showing the measuring points of the aligner engaging the felly.

Fig. 4 is a plan view of the same with a portion of the wheel broken away, and

Fig. 5 is a perspective view of a modified form of the aligner.

Referring to the drawings, numeral 10 designates generally an automobile or other vehicle of any form and design beneath the front wheels of which is placed the aligning device of this invention, which is particularly illustrated in Fig. 5, and consists of a frame comprising cross bars 11 and 12 which are connected together at opposite ends by brackets 13 and 14, these brackets having upturned ends upon which are pivoted a pair of cross bars 15 and 16 which are connected together to form an arm arranged so as to move in an arc about members 13 and 14 and in the longitudinal vertical plane of the frame. The free ends of members 15 and 16 may or may not be provided with pivoted members 17 and 18, respectively, which are movable relatively to and in the planes of the arms comprising members 15 and 16. Through the free ends of members 17 and 18 the measuring points 19 are tapped. As shown in Fig. 5, these pivoted members 17 and 18 may be omitted and measuring points 19 tapped through the free ends of members 15 and 16. The use of members 17 and 18, however, is preferred inasmuch as their use lends greater flexibility of operation to the device, since by moving together or spreading apart these members the device may be used to measure the alignment of wheels of different diameters such as wheels of smaller or larger forms of automobiles. Measuring points 19 are preferably long screws with pointed tips, which may be adjusted longitudinally to bring the tips of both measuring points of each side in a plane which is exactly parallel to the corresponding plane of the wheel to be measured. The projection of each of these measuring points may be adjusted at will to allow for the depression of the wheel felly below the edge of the tire in the manner illustrated in Figs. 2 and 4, and to measure the degree of disalignment, amount of toe-in of the front wheels, and the like.

As illustrated in Figs. 1 to 4 inclusive, the aligning device is adapted to be placed transversely of the vehicle beneath the wheels to be measured and this may be done by laying the device in front of or behind the wheels and moving the vehicle so that the wheels are placed between the cross bars 11 and 12, whereby the latter are held in position directly beneath the axis and hubs of the wheels to be measured. In this manner the aligner is accurately positioned for use. Prior to being used, points 19 in each end of the aligning device are adjusted so that the tips of these points will all engage the same points on opposite wheels if the wheels are properly aligned. While in the position illustrated in Fig. 1, the pivoted arms at the ends of the device are moved substantially perpendicularly to the planes of the wheels as indicated by the arrows in Fig. 1 to the position shown in phantom, so that the tips of the measuring points 19 engage the outer surfaces of the fellies 21 near the horizontal axis of the wheels to be measured, in the manner illustrated in Figs. 2, 3 and 4. If the wheels are in exact alignment and running true with respect to each other, the tips of measuring points 19 will all engage the surfaces of the fellies 21 and if the wheels are out of alignment, the tips will not engage properly but will indicate the degree to which the alignment of the wheels must be corrected in order to place them in proper alignment relatively to each other. Inasmuch as the hinged structures at each side comprising crossed bars 15 and 16 are accurately spaced by cross-bars 11 and 12 of the frame they always move in a fixed relation to each other, so that accuracy of measurement is assured for any position of these hinged structures.

Movable members 17 and 18, in the free ends of which measuring points 19 are mounted, are adjustable relatively to the frame of the aligning device so that they may be moved in a direction parallel to the plane of the wheel to place the tips of measuring points 19 opposite the felly of the wheel. The provision of these movable members 17 and 18 is particularly advantageous, as they lend greater flexibility of use to the device, whereby it may be employed for the alignment of wheels of all sizes, but members 17 and 18 may be omitted if the device is to be used to check the alignment of wheels of uniform size. It is preferred that the measuring be done at points on the wheel felly which lie approximately on the horizontal axis of the plane of the wheel, as shown in Fig. 3. It is apparent that measurement along the horizontal axis of the wheel will give the greatest indication of the plane of any dis-alignment rather than a similar measurement on a point either above or below the horizontal axis of the wheel.

If it is desired to measure the relative alignment of the wheels around their periphery, the wheels may be jacked up from the ground sufficiently to permit their free rotation, whereby the rotation of the wheels with the measuring points 19 of the device in contact with the fellies 21 will show whether the wheels are running true. For this purpose the wheel jacks may be inserted in the space between cross bars 11 and 12, and care must be exercised to place cross-bars 11 and 12 parallel to the line of the axis of the wheels, as these bars will not be centered by the tires in the manner described above. This proper placement of the device may be done by inserting it beneath the tires before jacking up the wheels.

The new vehicle wheel aligner accordingly offers many important advantages over those heretofore employed and provides a useful accessory which may be readily used in order to check the alignment of the wheels of an automobile, for example, and especially the alignment of the front wheels, without resorting to elaborate apparatus or requiring much labor. The flexibility in adjustment of the device permits it to be used in measuring the alignment of the wheels of all types of cars and trucks and the fact that the measuring points are mounted on pivotal members permits it to be adjusted to wheels of all widths and all pitches with respect to each other and to the road. By forming the device from commercial metal strap or bar stock, it may be economically manufactured and at the same time will be light in weight and therefore readily handled and used, and the hinged relation between the frame and the measuring elements permits the latter to be folded down upon the frame so as to make a compact unit when not in use.

I claim:

1. A vehicle wheel aligning device comprising a frame to be placed transversely of and beneath the wheels so as to be positioned thereby, arms connected to said frame and projecting beyond the outer surfaces of the wheels and means on said arms adapted to engage diametrically opposite points on the outer surfaces of the wheels.

2. A wheel aligning device, comprising a frame adapted to be placed in the vertical plane of the axes of opposite wheels, movable arms pivotally mounted upon opposite ends of the frame so as to be movable to and from the wheels, and spaced measuring members mounted on the arms and adapted to engage the surfaces of the fellies of the opposite wheels.

3. A wheel aligning device comprising a frame adapted to be placed beneath opposite wheels and parallel to the axes thereof, arms pivoted at the ends of the frame, said arms being swingable in a plane substantially perpendicular to the plane of the wheels, and members on each of said arms adapted to engage corresponding opposite points on the outside surfaces of the same wheel fellies.

4. A wheel aligning device comprising a frame adapted to be placed beneath opposite wheels and parallel to the axes thereof, arms pivoted at the ends of the frame, said arms being swingable in a plane substantially perpendicular to the plane of the wheels, members mounted on said arms and movable relatively to the arms in a direction substantially parallel to the plane of the wheels, said members having portions adapted to engage the outside surfaces of the wheel fellies.

5. A wheel aligning device comprising a frame adapted to be placed beneath opposite wheels and parallel to the axes of rotation thereof, arms pivoted at the ends of the frame, said arms being swingable in a plane substantially perpendicular to the plane of the wheels, and a pair of members on each of said arms adapted to engage the outside surfaces of the wheel fellies at substantially diametrically opposite points.

6. A wheel aligning device comprising a frame adapted to be placed beneath opposite wheels and parallel to the axes of rotation thereof, arms pivoted at the ends of the frame, said arms being swingable in a plane substantially perpendicular to the plane of the wheels, and a pair of relatively adjustable members on at least one of said arms adapted to engage the outside surfaces of the same wheel felly at diametrically opposite points at approximately the horizontal center line of the wheel.

7. A wheel aligning device comprising a frame adapted to be centered in operative position by being held between opposite wheels and the ground, an arm mounted at each end of the frame, by movement to and from the corresponding wheel, and a pair of spaced measuring points on each arm adapted to engage diametrically opposite points on the surfaces of the wheels.

8. A vehicle wheel aligning device comprising a frame adapted to be positioned by being held between opposite wheels and the ground, a plurality of spaced measuring means adapted to engage different points on the surfaces of the opposite wheels, means pivotally mounting said first means at each end of the frame, said first means being adjustable relatively to each other with respect to the surfaces of the wheels.

In testimony whereof I affix my signature.

LLOYD GEHMAN TAYLOR.